United States Patent
Zisman et al.

(10) Patent No.: US 12,175,285 B1
(45) Date of Patent: Dec. 24, 2024

(54) PROCESSING UNIT SELECTION MECHANISM

(71) Applicant: Amazon Technologies, Inc., Seattle, WA (US)

(72) Inventors: Nitzan Zisman, Beer Sheba (IL); Said Bshara, Tira (IL); Erez Izenberg, Tel Aviv-Jaffa (IL); Avigdor Segal, Netanya (IL); Jonathan Cohen, Kfar Saba (IL); Anna Rom-Saksonov, Rosh Haayin (IL); Leah Shalev, Zikhron Ya'Aqov (IL); Shadi Ammouri, Nazareth (IL)

(73) Assignee: Amazon Technologies, Inc., Seattle, WA (US)

( * ) Notice: Subject to any disclaimer, the term of this patent is extended or adjusted under 35 U.S.C. 154(b) by 644 days.

(21) Appl. No.: 17/305,151

(22) Filed: Jun. 30, 2021

(51) Int. Cl.
*G06F 9/48* (2006.01)
*G06F 9/30* (2018.01)
*G06F 9/355* (2018.01)
*G06F 9/50* (2006.01)
*G06F 13/28* (2006.01)

(52) U.S. Cl.
CPC ........ *G06F 9/4881* (2013.01); *G06F 9/30043* (2013.01); *G06F 9/3555* (2013.01); *G06F 9/5033* (2013.01); *G06F 9/5044* (2013.01); *G06F 9/505* (2013.01); *G06F 13/28* (2013.01)

(58) Field of Classification Search
None
See application file for complete search history.

(56) References Cited

U.S. PATENT DOCUMENTS

| 7,782,782 | B1 | 8/2010 | Ferguson et al. |
| 2020/0192715 | A1* | 6/2020 | Wang ............... G06F 12/0253 |
| 2020/0285510 | A1* | 9/2020 | Maeda ............... G06F 9/5038 |

OTHER PUBLICATIONS

Tiwari et al., "Dynamic Load Balancing Algorithm for Scalable Heterogeneous Web Server Cluster with Content Awareness", Dec. 2010, IEEE, pp. 143-148. (Year: 2010).*
Monsouri et al., "Cost-based job scheduling strategy in cloud computing environments", Jul. 16, 2019, Springer Science+Business Media, LLC, pp. 365-400. (Year: 2019).*
Yadav et al., "Priority based task scheduling by mapping conflict-free resources and Optimized workload utilization in cloud computing", Aug. 2016, IEEE, pp. 1-6. (Year: 2016).*

* cited by examiner

*Primary Examiner* — Qing Yuan Wu
(74) *Attorney, Agent, or Firm* — Weaver Austin Villeneuve & Sampson LLP

(57) ABSTRACT

An integrated circuit for distributing processing tasks includes a pre-selector circuit and a scheduler circuit. The pre-selector circuit is configured to receive a processing task, determine a category of the processing task, and select, from a set of task distribution techniques and based at least in part on the category of the processing task, a task distribution technique for distributing the processing task to a group of processing units. The scheduler circuit is configured to implement the selected task distribution technique to select, from the group of processing units, a target processing unit for performing the processing task.

17 Claims, 8 Drawing Sheets

PROCESSING UNIT SELECTION MECHANISM

BACKGROUND

Modern computing systems often integrate multiple processing units of the same types or different types, such as CPUs, network processors, direct memory access (DMA) engines, neural network accelerators, or other processing engines. These processing units may operate in parallel to perform processing tasks of a same type or different types and/or to perform processing tasks from a same source or different sources, thereby improving the overall throughput of the system and reducing the latency for performing a given processing task.

BRIEF DESCRIPTION OF THE DRAWINGS

Various embodiments in accordance with the present disclosure will be described with reference to the drawings, in which.

DETAILED DESCRIPTION

Figure 1:
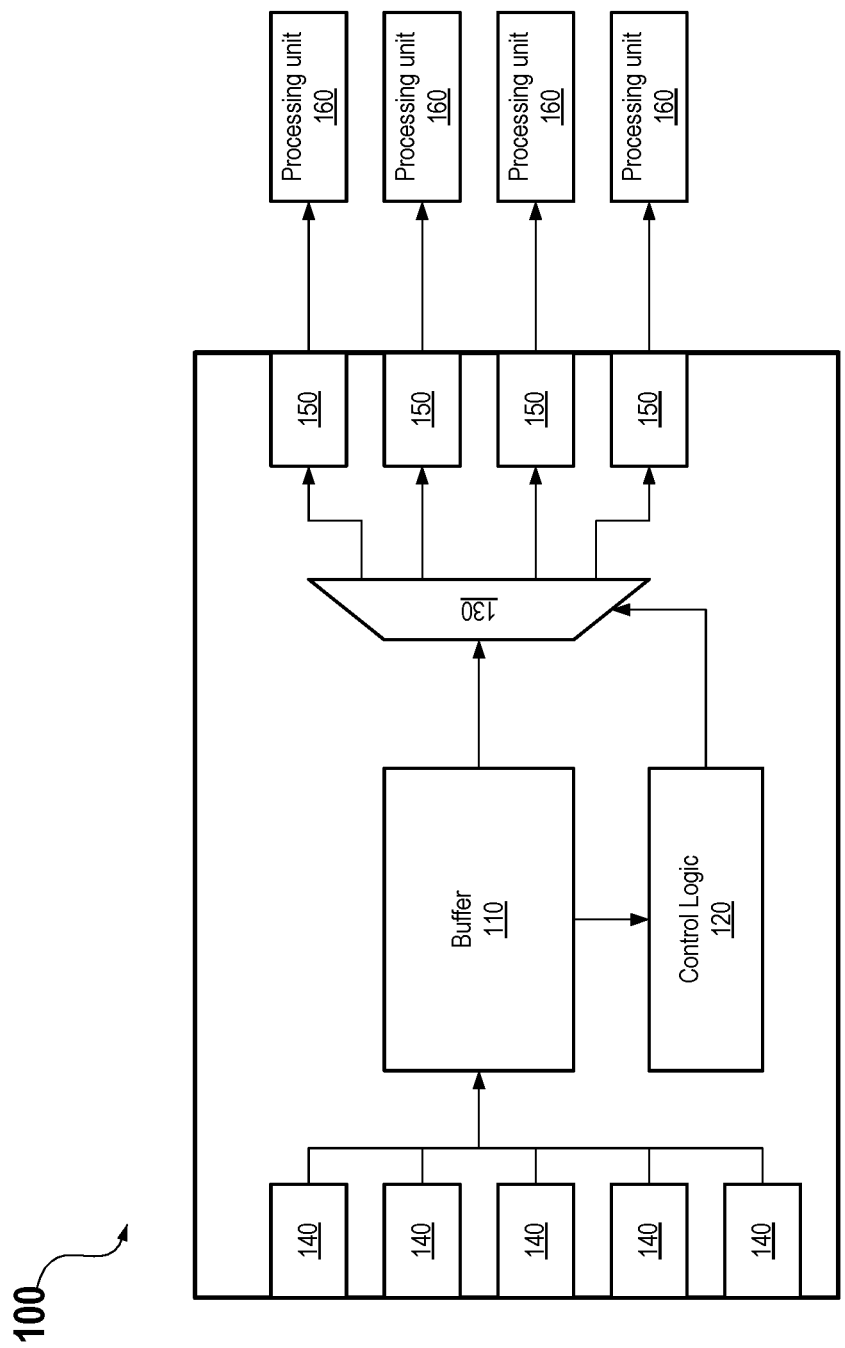
FIG. 1 includes a simplified block diagram of an example of a device for distributing processing tasks in a computing system.

In systems with multiple processing units, processing tasks of different types and/or from different sources or flows may need to be intelligently distributed among the multiple processing units, in order to achieve the desired performance in different scenario. For example, in a system with multiple CPUs for network packets processing, a task distribution technique (also referred to herein as an arbitration technique or a scheduling technique) may be used to distribute network packets to the CPUs for processing. For some applications, it may be desirable that the processing tasks are more evenly distributed to the processing units such that the processing units may be more efficiently utilized and no processing units may be overloaded or congested, thereby reducing the delay (or latency) and improving the throughput for the applications. In some applications, merely evenly distributing the processing tasks among the processing units may not achieve the desired performance. For example, in some systems or applications, it may be desirable that processing tasks having similar characteristics are performed by a same processing unit or a same type of processing units. For example, in some applications, it may be desirable that data packets in a same flow are processed in order by a same processing unit or a same type of processing units.

One example of a task distribution technique is the complete random distribution or round robin distribution of incoming processing tasks (e.g., network packets) to the available processing units (e.g., CPUs or network processors). This technique may cause out-of-order processing for network packets in some network flows, such as Transmission Control Protocol (TCP) flows, and thus may need data structures for exchanging state information of a network flow between different network processing units. Another technique is to use a work-conserving scheduler to distribute processing tasks to the processing unit with the least load. This technique may also cause out-of-order processing of packets in a network flow, such as a TCP flow. Another task distribution technique is the receive side scaling (RSS) technique. The RSS technique may be used to select a target processing unit for packet processing based on the network flow, where the network flow may be defined using the L3/4 5-tuple (e.g., source IP address, source port number, destination IP address, destination port number, and protocol identifier). For example, a hash function may be performed on incoming network packets, and the results of the hash function may be used to determine the network processing units for the packets. The RSS technique may ensure that packets of a same flow can be processed by the same CPU core, and may improve performance in some applications (for example, avoiding data structures sharing between CPU cores). However, incoming network packets from different network flows may not be hashed uniformly, and thus may cause uneven distribution of workload on the network processing units.

According to certain embodiments, a device (e.g., a network interface card) may include a control logic circuit that may select appropriate task distribution techniques for distributing processing tasks (e.g., network packets) to processing units (e.g., CPUs, network processors, DMAs, neural network accelerators, other processing engines, or queues), based on categories of the processing tasks (e.g., types, protocols, or service types of the network packets, which may be collectively referred to herein as the categories of the processing tasks), alone or in combination with the load status and/or capability of the processing units. For example, for processing tasks that do not need to be performed in order, task distribution techniques such as round robin, weight round robin, or any other techniques that can more evenly distribute processing tasks may be selected to distribute the processing tasks. For some categories of processing tasks that may need to be performed in order (e.g., packets of a TCP flow) or may be more efficiently processed by a same processing unit, RSS technique or other task distribution techniques that can distribute processing tasks having similar characteristics to a same processing unit while keeping reasonable load balance between different processing units may be selected to distribute the processing tasks (e.g., by performing a hash function on some fields of the packets). In this way, the overhead for fetching data may be reduced and the cache hit ratio may be improved, thereby improving the overall performance of the system.

In some embodiments, the control logic circuit may select the task distribution techniques based on both the categories of the processing tasks and the capability and the load of the processing units. For example, if the load of all processing units is light, the control logic circuit may select a round robin (RR) technique. If some processing units are heavily loaded while some processing units are lightly loaded, the control logic circuit may select a weighted round robin (WRR) distribution technique, where heavily loaded processing units may be assigned lower weights or lower priorities. In some embodiments, the control logic circuit may select a batching mode and batching sizes for task distribution based on the load and capability (e.g., bandwidth or processing power) of the processing units.

In some embodiments, the control logic circuit may select processing units based on the categories of the processing tasks, the load of the processing units, the capability of the processing units, or a combination thereof. For example, the control logic circuit may select a group of processing units that are more suitable for performing a category of processing tasks, such as processing network packets of a particular type, protocol, or service. The control logic circuit may alternatively or additionally select a group of processing units from processing units in the system, based on the load of the processing units. For example, the control logic circuit may select the group of processing units that are more suitable for performing the category of processing tasks, but may exclude a processing unit that is suitable for performing the category of processing tasks but is heavily loaded from the selected group. In some embodiments, the control logic circuit may assign different weights to processing units in the system (e.g., assigning low or zero weights for heavily loaded processing units) or may assign different weights only to the selected processing units.

Based on the selected task distribution techniques and/or the selected group of processing units, an arbiter or another scheduler of the control logic circuit may implement the selected task distribution techniques for distributing incoming processing tasks to the processing units in the system or only to the selected group of processing units (if selected). The arbiter/scheduler may be load-aware and thus may select a target processing unit based on the load (and weights) of the processing units or the load (and weights) of the selected group of processing units, for example, using the weight round robin technique. In some embodiments, the arbiter/scheduler may use a batch size (or burst size) determined based on, for example, the load of the processing units, sizes of the packets, and/or capability of the processing units, to distribute multiple processing tasks to a same processing unit before selecting another processing unit. In some embodiments, different batch sizes may be used for different processing units.

Techniques disclosed herein use different task distribution techniques and/or different groups of processing units for different types of processing tasks, and select target processing units based on load status, weights, and/or batch sizes of the processing units. Therefore, techniques disclosed herein may more evenly distribute different types of processing tasks (e.g., network packets) to processing units (e.g., CPU or other processing engines), while reducing out-of-order network packet processing. Techniques disclosed herein can be used to forward packets of mainstream network protocols (e.g., TCP or User Datagram Protocol (UDP)) and other protocols, such as Remote Direct Memory Access (RDMA), storage transport layers, and the like. Techniques disclosed herein may be used to distribute processing tasks to various processing units, such as CPUs, DMAs, network processors, and neural network accelerators.

As used herein, a flow, a network flow, or a data flow refers generally to a stream of associated network packets, in some cases, traversing the network in order. In a network environment, a user application on a source endpoint may desire to send a user application data stream to a destination endpoint through the network. The data may be one or more messages, one or more commands, or one or more transactions. In some cases, the source endpoint and the destination endpoint may each have a unique Internet protocol (IP) address. In such cases, a user application data stream intended to be transferred from a source IP address to a destination IP address in a single connection may be referred to as a data flow, a network flow, or a flow. In some other cases, multiple endpoints may share an IP address, and user application data streams between endpoints can thus be multiplexed in an IP-level data stream between a pair of source and destination IP addresses. In these cases, user application data streams from the multiple endpoints intended to be transferred from a source IP address to a destination IP address in a single connection may be referred to as a data flow, a network flow, or a flow, where the source IP address may be shared by multiple endpoints. In some other cases, an endpoint may have multiple IP addresses and a user application data stream may be intended to be sent through multiple paths using the multiple IP addresses. In these cases, each part of the user application data stream, which is intended to be transferred from a source IP address to a destination IP address in a single connection, may be referred to as a data flow, a network flow, or a flow.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network system may include multiple queues or other processing flows to improve the throughput (e.g., the number of packets that can be processed per second) of the system, where multiple CPUs may poll packets from the queues independently, for example, from their respective assigned queues. A distribution strategy may often be used to more evenly distribute the packets among the queues. Otherwise, all incoming packets may go to one queue to overload one CPU, while other CPUs may not be utilized or may be underutilized. Network packets may be distributed across network processing units (e.g., CPUs, network processors, or other processing units) using several different techniques.

In one example, incoming network packets may be distributed to the network processing unit randomly. In this way, the processing tasks may be evenly distributed to the processing units over a longer period of time. However, different processing units may have different workloads, latencies, bandwidths, throughputs, or other computing capacity. Therefore, even if the processing tasks are evenly distributed to the processing units, the processing tasks may experience different delays and/or different process times. As such, network packets from a same network flow but distributed to different processing units may experience different delays, and thus may be delivered in an order different from the order in which they are transmitted or may be processed in an order different from the order in which they are received. Furthermore, processing units that are handling network packets from a same flow (e.g., a TCP flow) may need to exchange state information of the flow frequently since the network packets from the same network flow are randomly distributed to different processing units.

Another technique for distributing processing tasks (e.g., network packets) is a round robin (RR) load-balancing technique, where a round robin load balancer may forward the network packets to processing units according to an order of a list of processing units. For example, in each round, a first packet may be forwarded to a first processing unit in the list, a second packet may be forwarded to a second processing unit in the list, and so on. After an incoming packet is forwarded to a processing unit at the end of the list, the load balancer may loop back and go down the same list in the same order in the next round. Therefore, the next incoming packet may be forwarded to the first processing unit, the packet after that may be forwarded to the second processing unit, and so on. A variation of the RR load balancer is the weighted round robin (WRR) scheduler. A WRR scheduler may manage multiple queues, where each queue i may be associated with a weight $w_i$. In each round, a WRR scheduler may give each queue i the opportunity to submit $w_i$ packets. The round robin or WRR load-balancing technique may not always result in even or efficient distribution of network load either, because many round robin load balancers assume that all processing units are the same, for example, all currently up, all handling the same load, all having same bandwidth and latency, and all with the same storage and computing capacity, which may not be the case in many situations. In addition, as in the random distribution technique, the round robin and WRR load-balancing techniques may also cause out-of-order processing or delivery of network packets for flows such as TCP flows, and may need frequent exchanging of state information of a given TCP flow among processing units that receive network packets from the given TCP flow.

A work-conserving scheduler may be used to distribute processing tasks (e.g., network packets) to processing units (e.g., CPUs, network processors, or other processing engines) with the least load such that the load on the processing units may be balanced. One example of the work-conserving scheduler is a deficit weighted round robin (DWRR, also referred to as deficit round robin) scheduler, where a deficit counter (e.g., token) is maintained for each queue (e.g., for a network flow) that may receive distinct treatment. The deficit counter may indicate the remaining capacity available to process data in the queue. If the deficit counter for a queue is greater than zero, the queue may be eligible to receive network packets. Network packets may be processed from each eligible queue in a round robin manner. The amount of data credited to each queue may vary based on different weights for the queues. An alternative to DWRR is to use a timestamp instead of a deficit counter for each queue. A timestamp for each queue can be initially set to zero and then incremented as network packets are processed from the queue. Network packets can be processed from the queue with the minimum timestamp. These techniques may also cause out-of-order network packet processing or delivery for some flows (e.g., TCP flows) where the order of the network packets may need to be maintained. Thus, different processing units receiving network packets from a same TCP flow may need to frequently exchange state information of the TCP flow.

Another technique for distributing processing tasks (e.g., network packets) is the RSS technique, which performs a hash function on each incoming network packet using at least a portion of the header of the network packet, and then uses the result of the hash function to index a hash table to find corresponding information regarding where to distribute the network packet.

FIG. 1 includes a simplified block diagram of an example of a device 100 for distributing processing tasks in a computing system. Device 100 may be, for example, a network device, such as a network interface card (NIC), and may be used to distribute incoming network packets to multiple processing units (e.g., CPUs or other processing engines). Device 100 may include a plurality of input ports 140 and a plurality of output ports 150. Output ports 150 may be connected to a plurality of processing units 160. Incoming processing tasks (e.g., network packets) may be received from one or more input ports 140 and sent to a buffer 110. In some embodiments, each input port 140 may include a buffer or queue for storing incoming network packets. In some embodiments, each output port 150 may include a buffer or queue for storing outgoing network packets to be processed by a given processing unit 160. Control logic circuit 120 may read incoming network packets and determine which processing unit 160 each incoming network packet should be distributed to. Control logic circuit 120 may then control a demultiplexer 130 to distribute the network packet to the determined processing unit 160 through a corresponding output port 150 or queue. In embodiments where output ports 150 include queues, processing units 160 may poll packets from the queues. As described above, in some implementations, control logic circuit 120 may implement, for example, a random scheduler, a RR scheduler, a WRR scheduler, an RSS scheduler, or another suitable scheduler.

Figure 2:
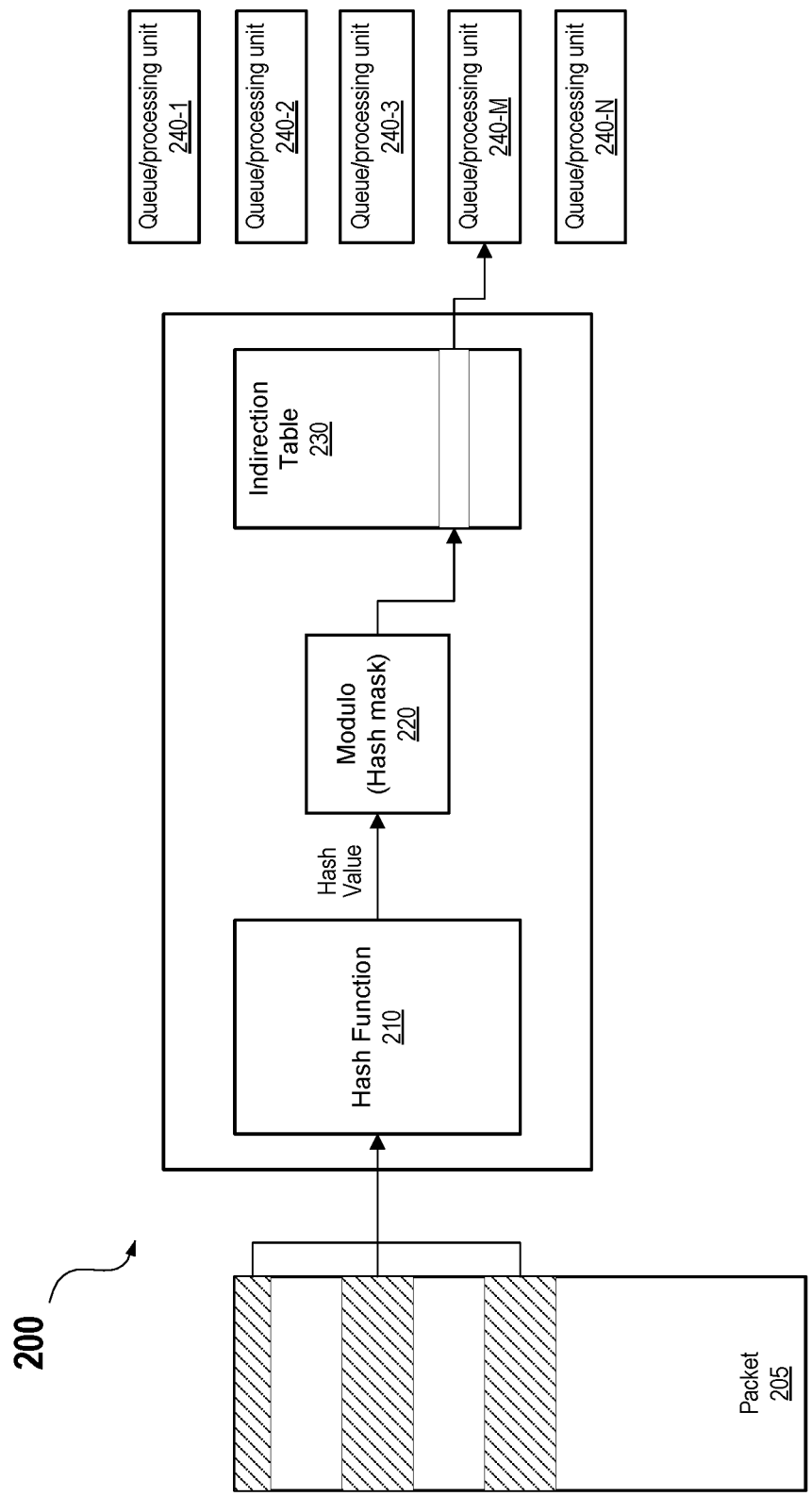
FIG. 2 illustrates an example of distributing processing tasks using receive side scaling.

FIG. 2 illustrates an example of distributing processing tasks using a receive side scaling scheduler. The RSS technique may enable the efficient distribution of network packets across multiple CPUs in multiprocessor systems. The RSS scheduler may include software and/or hardware for implementing a hash function 210. Hash function 210 may be applied on network packet fields in the header of a network packet 205 to compute a hash value. Hash function 210 may be a function that can map data of an arbitrary size to data of a fixed size. Hash function 210 can map a search key to an index, which may indicate where the corresponding entry is stored in a hash table. The values returned by a hash function may be referred to as hash values, hash codes, hash sums, or simply hashes. A search key may be mapped to a certain hash value. Multiple different search keys may be mapped to a same hash value. The hash function may be any suitable hash function, such as a Toeplitz hash function. Hash function 210 may perform the hash function using, for example, the source IP address, the destination IP address, the source port or MAC address, the destination port or MAC address, the protocol identifier associated with the packet, and/or the flow identifier.

A modulo function 220 may be used to divide the hash value by a certain number (which may be determined based on the number of processing units), and the remainder (the modulo value) may be used to index an indirection table 230. In some embodiments, modulo function 220 may be implemented using a hash mask, where the most significant bits (MSBs) of the hash value may be masked and the least significant bits (LSBs) of the hash value may be used to index indirection table 230.

When device 100 is started with multiple output ports, queues, or connected processing units, indirection table 230 may be generated based on the RSS configurations, such as certain selected fields in the header of the network packets and the number of output ports, queues, or connected processing units. Indirection table 230 may include a plurality of entries, where each entry may include a field indicating an output port (or the corresponding queue or processing unit) for the network packet. Thus, the value in the entry of the indirection table indexed by the modulo value may indicate the target CPU for processing the network packet. Network packet 205 may then be sent to the target CPU or a queue for the target CPU, such as queue or processing unit 240-M in the illustrated example.

In RSS, network packets in a same flow may be associated with the same flow identifier, source IP address, destination IP address, source port, and destination port, and therefore may provide same input to the hash function and may be mapped by the hash function to a same hash value and a same entry in indirection table 230, and thus may be directed to a same queue/processing unit 240-1, 240-2, . . . , 240-M, . . . , or 240-N. This may reduce the number of packets that are processed or delivered out-of-order for a same flow because all network packets from a network flow are processed by a same processing unit. However, because different network flows may include different numbers of packets and a hash function may return a deterministic hash value for packets from a same network flow, incoming network packets from different network flows may not be hashed uniformly to the processing unit, and thus may cause uneven distribution of workload on the processing units. For example, some processing units may be overloaded, while some other processing units may be idle or lightly loaded.

Thus, task distribution techniques such as the random distribution technique, round robin distribution technique, weighted round robin distribution technique, or RSS distribution technique may not evenly distribute the processing task to achieve similar delays or processing time, may cause out-of-order processing for network packets in network flows (e.g., TCP flows), and/or may need data structure to exchange or share state information of a network flow between the processing units.

According to certain embodiments, a device (e.g., a network interface card) may include a control logic circuit that may select appropriate task distribution techniques for distributing processing tasks (e.g., network packets) to processing units (e.g., CPUs, network processors, DMAs, neural network accelerators, other processing engines, or queues), based on categories of the processing tasks (e.g., types, protocols, or service types of the network packets, which may be collectively referred to herein as the categories of the processing tasks), alone or in combination with the load status and/or capability of the processing units. For example, for processing tasks that do not need to be performed in order, task distribution techniques such as round robin, weight round robin, or any other techniques that can more evenly distribute processing tasks may be selected to distribute the processing tasks. For some categories of processing tasks that may need to be performed in order (e.g., packets of a TCP flow) or may be more efficiently processed by a same processing unit, RSS technique or other task distribution techniques that can distribute processing tasks having similar characteristics to a same processing unit while keeping reasonable load balance between different processing units may be selected to distribute the processing tasks (e.g., by performing a hash function on some fields of the packets). In this way, the overhead for fetching data may be reduced and the cache hit ratio may be improved, thereby improving the overall performance of the system.

In some embodiments, the control logic circuit may select the task distribution techniques based on both the categories of the processing tasks and the capability and the load of the processing units. For example, if the load of all processing units is light, the control logic circuit may select a round robin (RR) technique. If some processing units are heavily loaded while some processing units are lightly loaded, the control logic circuit may select a weighted round robin (WRR) distribution technique, where heavily loaded processing units may be assigned lower weights or lower priorities. In some embodiments, the control logic circuit may select a batching mode and batching sizes for task distribution based on the load and capability (e.g., bandwidth or processing power) of the processing units.

In some embodiments, the control logic circuit may select processing units based on the categories of the processing tasks, the load of the processing units, the capability of the processing units, or a combination thereof. For example, the control logic circuit may select a group of processing units that are more suitable for performing a category of processing tasks, such as processing network packets of a particular type, protocol, or service. The control logic circuit may alternatively or additional select a group of processing units from processing units in the system, based on the load of the processing units. For example, the control logic circuit may select the group of processing units that are more suitable for performing the category of processing tasks, but may exclude a processing unit that is suitable for performing the category of processing tasks but is heavily loaded from the selected group. In some embodiments, the control logic circuit may assign different weights to processing units in the system (e.g., assigning low or zero weights for heavily loaded processing units) or may assign different weights only to the selected processing units.

Based on the selected task distribution techniques and/or the selected group of processing units, an arbiter or another scheduler of the control logic circuit may implement the selected task distribution techniques for distributing incoming processing tasks to the processing units in the system or only to the selected group of processing units (if selected). The arbiter/scheduler may be load-aware and thus may select a target processing unit based on the load (and weights) of the processing units or the load (and weights) of the selected group of processing units, for example, using the weight round robin technique. In some embodiments, the arbiter/scheduler may use a batch size (or burst size) determined based on, for example, the load of the processing units, sizes of the packets, and/or capability of the processing units, to distribute multiple processing tasks to a same processing unit before selecting another processing unit. In some embodiments, different batch sizes may be used for different processing units.

Figure 3:
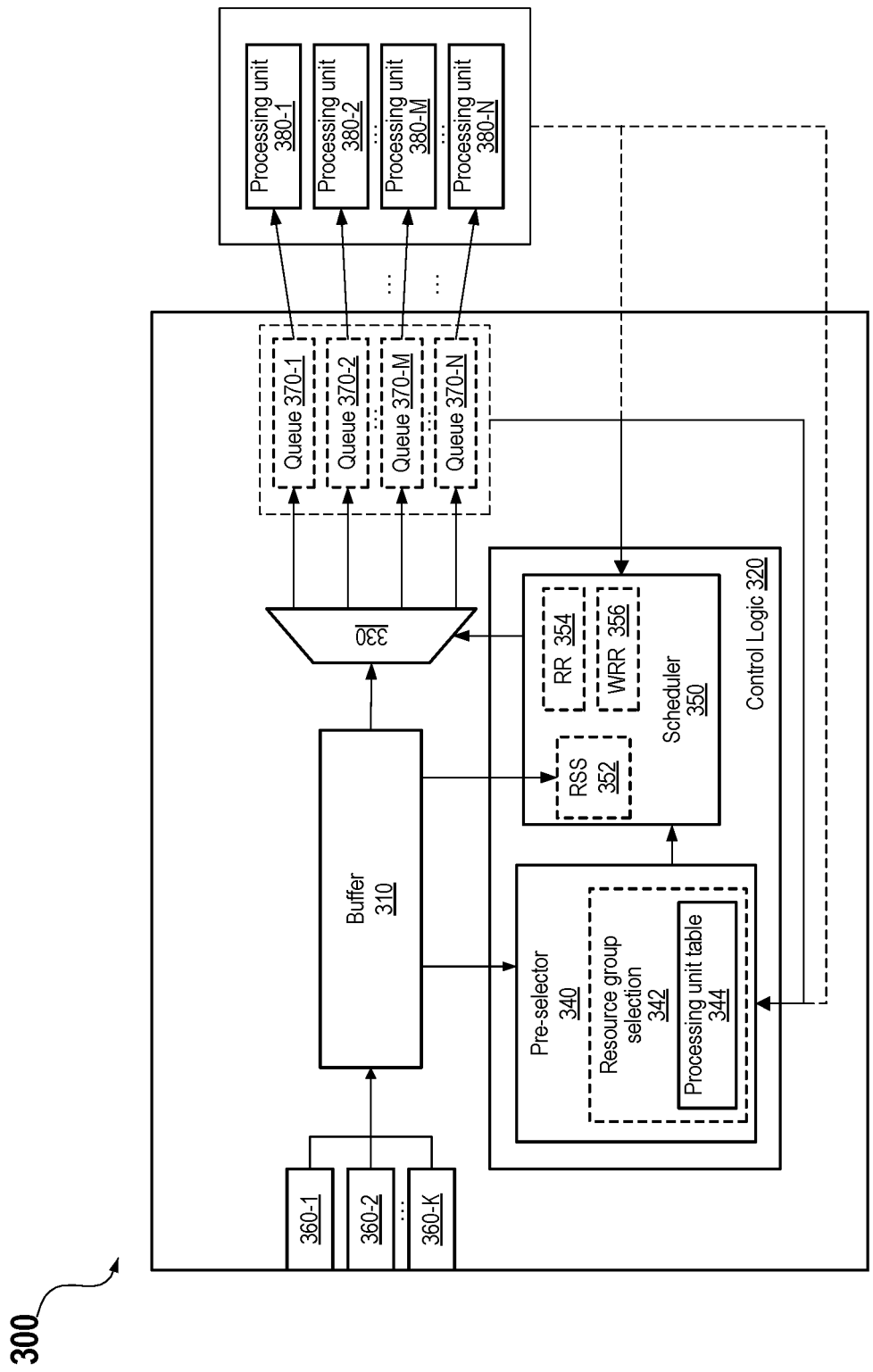
FIG. 3 illustrates a simplified block diagram of an example of a device for distributing processing tasks in a computing system according to certain embodiments.

FIG. 3 includes a simplified block diagram of an example of a device 300 for distributing processing tasks in a computing system according to certain embodiments. Device 300 may be, for example, on a network interface card for a communication system or a clouding computing system, or may be a device in a high performance computing (HPC) system, a network storage system, and the like. Device 300 may be used to distribute incoming processing tasks (e.g., network packets) to multiple processing units, such as CPUs, network processors, neural network processors/accelerators, DMAs, digital signal processors (DSPs), or other processing engines.

Device 300 may include a plurality of input ports (e.g., input ports 360-1, 360-2, . . . , and 360-K, collectively referred to as input ports 360) and a plurality of output ports or optional output queues (e.g., queues 370-1, 370-2, . . . , 370-M, . . . , and 370-N, collectively referred to as queues 370). The output ports or queues 370 may be connected to a plurality of processing units (e.g., processing units 380-1, 380-2, . . . , 380-M, . . . , and 380-N, collectively referred to as processing units 380). Incoming processing tasks (e.g., network packets) may be received from one or more input ports 360 and sent to a buffer 310. In some embodiments, each input port 360 may include a buffer or queue for storing incoming network packets. In some embodiments, each of queues 370 may be used to store outgoing network packets to be processed by a corresponding processing unit 380. Control logic circuit 320 may read incoming network packets and determine which processing unit 380 each incoming network packet should be distributed to. Control logic circuit 320 may then control a demultiplexer 330 to distribute the network packet to the determined processing unit 380 through a corresponding output port or a queue 370. Processing units 380 may poll network packets from queues 370.

In the illustrated example, control logic circuit 320 includes a pre-selector 340 and a scheduler 350 (e.g., an arbiter). As described above and in more detail below, pre-selector 340 may select task distribution techniques based on categories of incoming processing tasks and/or the load of the processing units, and may also select a group of processing units based on the categories of the incoming processing tasks, the load of the processing units, and/or the capability of the processing units. Pre-selector 340 may select the task distribution techniques and/or the group of processing units for each incoming processing task, for a number of incoming processing tasks, periodically, based on the load of the processing units, or a combination thereof. Scheduler 350 may, based on the task distribution techniques and/or the group of processing units selected by pre-selector 340, implement a random scheduler, an RR scheduler, a WRR scheduler, an RSS scheduler, or another suitable task distribution technique.

Pre-selector 340 may read a processing task from buffer 310, parse the processing task, and determine the categories of the processing task. For example, the processing task may be a network packet to be processed by a CPU. Pre-selector 340 may parse the header of the network packet and identify certain fields of the network packet, such as the L3/4 5-tuple used in RSS schedulers, and other information of the network packet not used by RSS schedulers, such as the type (or version) of the network packet (e.g., IPv4 or IPv6), the protocol of the network packet (e.g., raw IP, TCP, UDP, Internet Control Message Protocol (ICMP), Real-Time Transport Protocol (RTP), or other protocols), the type of service of the network packet. The type of service of the network packet may be determined based on the option specified in the type of service (TOS) subfield, such as minimum delay, maximum throughput, maximum reliability, or minimum cost (monetary), or may be determined based on the application of the network packet, such as net network storage, high performance computing, or real-time data analysis/rendering. Based on these information associated with the network packet, pre-selector 340 may select a task distribution technique among several different task distribution techniques that scheduler 350 may implement, such as the random, RR, WRR, and RSS techniques. For example, for TCP packets or packets of other connection-oriented protocols, the RSS technique may be selected. For packets of UDP or other protocols that support bandwidth-intensive applications and can tolerate packet loss or out-of-order delivery, the random, RR, or WRR technique may be selected.

In some implementations, pre-selector 340 may select the task distribution techniques based on both the categories of the processing tasks and the capability and current load of the processing units. For example, if the load of all processing units is light, pre-selector 340 may decide to select the RR technique; if some processing units are heavily loaded while some processing units are lightly loaded, pre-selector 340 may select a WRR distribution technique where heavily loaded processing units may be assigned lower weights.

As illustrated in FIG. 3, the load information of the processing units may be collected internally based on status of queues 370 that hold packets to be processed by processing units 380, or may be received from processing units 380 or other circuits. For example, the load information of processing units 380 may be measured by processing units 380 internally, or may be measured externally through other load measurements, such as the status of caches used by processing units 380. In some embodiments, control logic circuit 320 may include CPU load state circuitry that may receive feedback from processing units 380 or other circuits in the system. The feedback may indicate the status of processing units 380, such as the load of the CPUs, the status of their caches, the status or fill levels of the queues, and other indications that reflect the status and load of processing units 380. These indications may, in combination, provide a more complete and clear status of processing units 380.

In some embodiments, control logic circuit 320 (e.g., pre-selector 340 of control logic circuit 320) may also select a batching mode and batching sizes (or burst sizes) for task distribution, based on the load and capability (e.g., bandwidth or processing power) of the processing units, and/or information of the processing tasks. For example, pre-selector 340 may determine, for a certain category of network packets, the batch size X for the network packets, where X network packets of the category may be distributed to a processing unit before network packets of the same category may be distributed to the next processing unit. The batch size X may be pre-determined or may be dynamically determined based on, for example, the category of the network packets or the system status. The batching mode may reduce overhead in the system by using a same processing unit for multiple packets, rather than switching to different processing unit after each packet. In some embodiments, pre-selector 340 may use the batching mode and select the batch sizes for relatively small packets where the payload may be small, and/or for lightly loaded processing units (e.g., with relative low fill level in the corresponding queues). In some embodiments, the batch size may be aligned with the software for processing the packets, to enable efficient software batch processing. The batching mode and the batch sizes determined by pre-selector 340 may be used by scheduler 350 when distributing the processing tasks. In some embodiments, the batching mode and the batch sizes may be determined by scheduler 350. In some embodiments, the batching mode and batch size may be determined per packet category, per processing unit, per group of processing units, or a combination thereof. In some embodiments, the batching mode and batch size for each packet category, for each processing unit, and/or for each group of processing may be updated dynamically during operations of device 300.

As illustrated in FIG. 3, in some implementations, pre-selector 340 may include a resource group selection unit 342, which may maintain a processing unit table 344. In some embodiments, processing unit table 344 may store information of processing units 380, such as workloads, latencies, bandwidths, or computing capacity of processing units 380. In some embodiments, information of the groups of processing units for different categories of processing tasks and/or the groups of processing units for different task distribution techniques may be stored in processing unit table 344. Based on the information (e.g., the type, protocol, and/or service type) of a processing task described above, and the information of the processing units and the information of the groups of processing units stored in processing unit table 344, resource group selection unit 342 may select a group of processing units as potential processing units for performing the processing task, such that scheduler 350 may only distribute the processing task to a processing unit in the selected group of processing units using the selected task distribution technique.

In some embodiments, the grouping of the processing units may be determined based on the capability of the processing units. For example, some processing units may be more suitable for performing certain categories of processing tasks, whereas some processing units may not be able to perform certain categories of processing tasks. In some embodiments, a limited number of target processing units may be selected for each packet category, and different groups of processing units may be selected for different packet categories, such that each packet may be distributed to one group of processing units based on the packet's characteristics, thereby keeping load balance among the different processing units in a system. RSS technique or other selected techniques (e.g., RR or WRR) may be used to distribute processing tasks of a different protocol to a different respective group of processing units. In some embodiments, the groups of processing units for different task distribution techniques may be different, and may be changed dynamically based on the load or other variables, such as availability or power state, of the processing units. For example, if a specific CPU or a specific set of CPUs in a group of processing units for performing a specific category of processing tasks is heavily loaded, the group of processing units for performing the specific category of processing tasks may be changed to include a different processing unit or a different set of processing units.

Based on the task distribution technique and/or the optionally group of processing units selected for a processing task or a group of processing tasks, scheduler 350 may select a specific processing unit 380 for performing the processing task or the group of processing tasks, according to load status of the processing units (e.g., the selected group of processing units). As described above, the load status of the processing units may be determined internal to device 300 or may be received externally from processing units 380 or other circuits or components of the system. Scheduler 350 may, for example, decide to stop forwarding processing tasks to a specific processing unit 380 that is heavily loaded or stop forwarding processing task into a queue 370 that is full or almost full; decide to change the batch size (or burst size) allocated to a specific processing unit or a specific group of processing units; decide to select a different group of processing units; or decide to change other forwarding parameters, such as the arbitration method, the arbitration weights, the arbitration burst sizes, or a combination thereof.

As described above, different arbitration methods may be used (e.g., based on the category of the processing task and/or the load status of the processing units) to select a target processing unit for a processing task or a group of processing tasks. For example, an RR scheduler 354 may be selected to relatively evenly distribute processing tasks using the round robin technique. In another example, a WRR scheduler 356 may be selected to distribute processing tasks using the weighted round robin technique, where each processing unit may have an associated weight indicating the number of processing tasks to be forwarded to the processing unit in each round. As describe above, the respective weights associated with the processing units can be dynamically changed based on the load status or other status of the processing units. In another example, an RSS scheduler 352 may be selected to distribute processing tasks using the RSS technique. RSS scheduler 352 may include, for example, a structure as described above with respect to FIG. 2, where RSS scheduler 352 may generate a hash value by performing a hash function on certain selected fields of a network packet, take a modulo of the hash value (e.g., using a hash mask to mask MSBs of the hash value), and index an indirection table using the modulo to identify a processing unit. Based on the target processing unit selected by scheduler 350, demultiplexer 330 may be controlled to send the processing task to the selected processing unit 380 or a queue 370 for the selected processing unit 380.

Even though not shown in FIG. 3, other schedulers or arbiters, such as various rate limiting scheduling techniques, can be selected to limit the rate or burst size of each processing unit. For example, the selected scheduler may distribute processing tasks based on packet time stamping, packet time of arrival, an accumulated size of packets forwarded to each processing unit, or any other arbitration method. In some embodiments, after a certain number (e.g., 10, 100, 500, or 1000) of processing tasks have been distributed by a scheduler, the scheduler may be replaced by a different scheduler, which may be used to distribute the next, for example, 100, 500, or 1000 processing tasks. The number of processing tasks distributed by each scheduler may be different or may be changed dynamically.

In some embodiments, the selection of the task distribution techniques (e.g., the schedulers) by pre-selector 340 may be based on the accumulated number of processing tasks that have been distributed using each task distribution technique. In some implementations, the scheduler may be changed every 1 millisecond (ms), every 5 ms, every 10 ms, or longer. In some embodiments, because the processing tasks (e.g., network packets) may have different sizes and thus the load on a processing unit may be better indicated by the number of bytes of data, rather than the number of packets, the scheduler may distribute processing tasks based on the data size of the network packets, rather than based on the number of network packets. For example, the batch size X may be 10 KBytes, 100 Kbytes, or 1 Mbytes, rather than a certain number (e.g., 10, 100, 500, or 1000) of network packets. In some embodiments, any combination of the methods and techniques disclosed herein may be used to select a target processing unit. Techniques disclosed herein can be used to select, for example, CPUs, network processors, other packet processing engine, DMA engines, queues, GPUs, or neural network processors.

Figure 4:
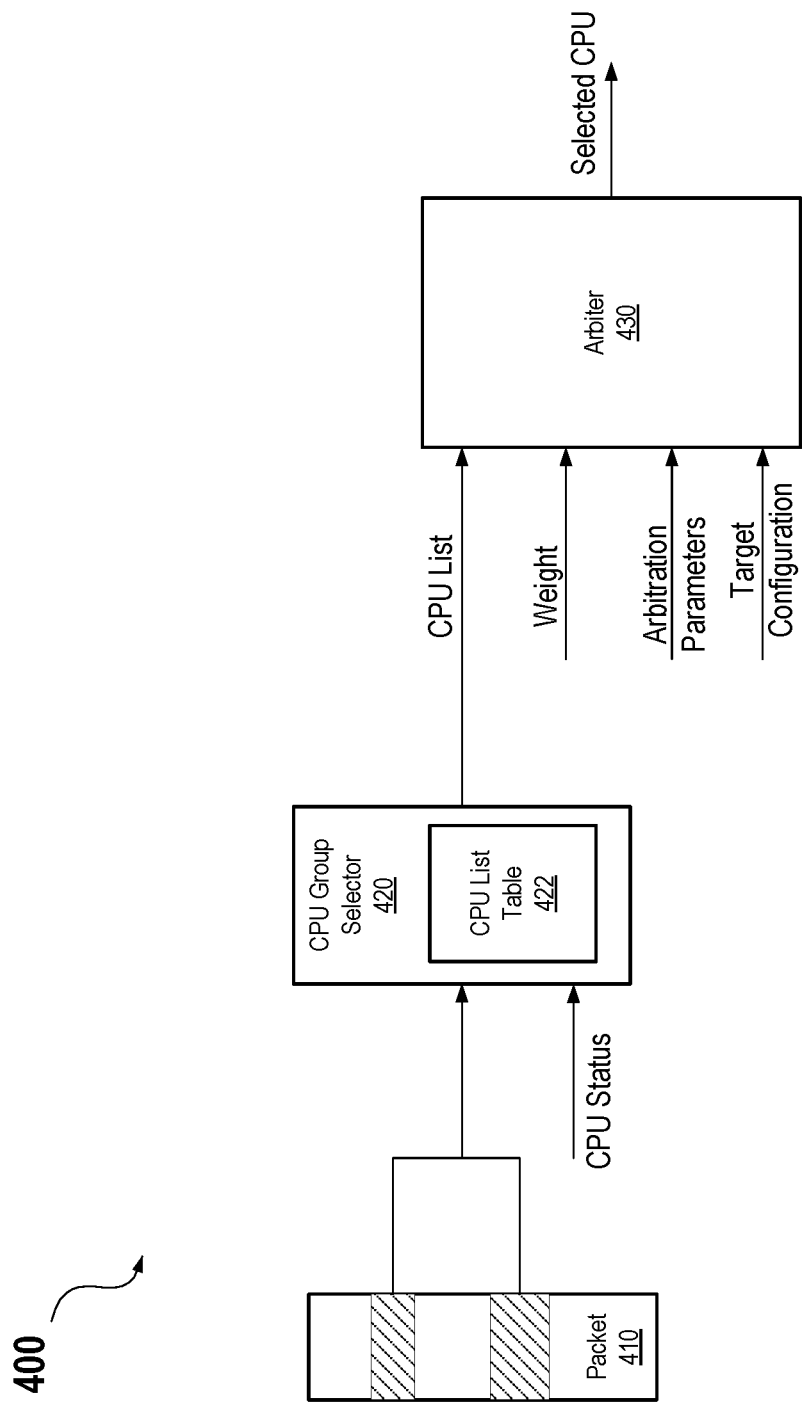
FIG. 4 illustrates an example of distributing processing tasks to processing units based on status of the processing units and characteristics of the processing tasks according to certain embodiments.

FIG. 4 illustrates an example of a method 400 of distributing processing tasks to processing units based on status of the processing units and characteristics of the processing tasks according to certain embodiments. Method 400 may be performed, for example, by control logic circuit 320, and may be used to relatively evenly distribute processing tasks among selected groups using a selected task distribution technique, such as, for example, the RR or WRR technique. In the illustrated example, a network packet 410 may be read and parsed by control logic circuit 320. A task distribution technique (e.g., RR or WRR) may be selected for distributing network packet 410 based on, for example, the category of network packet 410 determined using certain fields of network packet 410 as described above. Based on the status (e.g., load status) of processing units (e.g., CPUs) in the system as described above and certain fields in network packet 410, a CPU group selector 420 (which may be an example of resource group selection unit 342) may select a CPU list from a CPU list table 422 (which may be an example of processing unit table 344). An arbiter 430 may implement a selected scheduler (e.g., RR or WRR scheduler) to distribute processing tasks (e.g., network packets) to CPUs in the selected CPU list.

In the illustrated example, arbiter 430 may select a CPU from the CPU list selected by CPU group selector 420 based on, for example, weights associated with each CPU in the selected CPU list if a weighted task distribution technique (e.g., WRR) is used. As described above, the weights may be determined based on, for example, the load status of the CPUs and the capability of the CPUs. Arbiter 430 may also use certain arbitration parameters of the selected arbitration technique, such as the batch size (e.g., the number of packets or the number of bytes in a burst) and/or the number of CPUs in the selected CPU list, to select the target CPU for network packet 410. In some embodiments, arbiter 430 may also use target configuration information, such as the configuration (e.g., batch size) for each CPU, to selected the target CPU for network packet 410.

Figure 5:
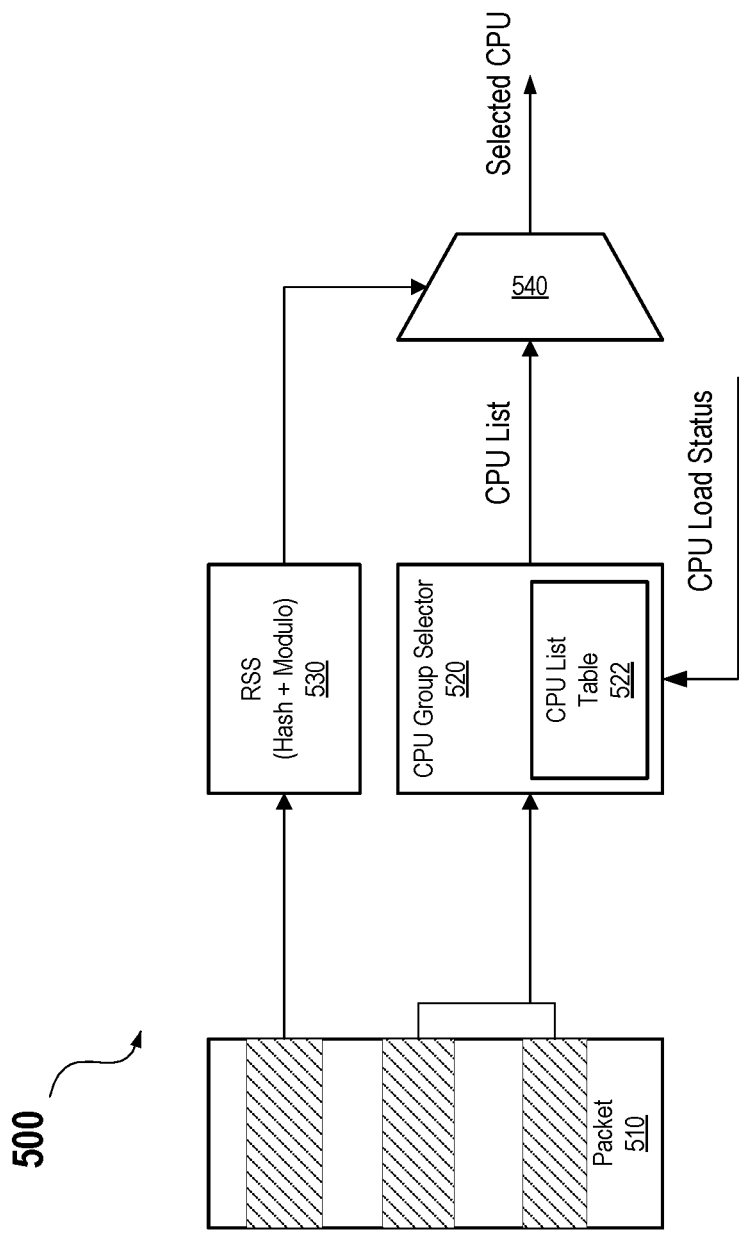
FIG. 5 illustrates another example of distributing processing tasks to processing units based on status of the processing units and characteristics of the processing tasks according to certain embodiments.

FIG. 5 illustrates another example of a method 500 for distributing processing tasks to processing units based on status of the processing units and characteristics of the processing tasks according to certain embodiments. Method 500 may be performed, for example, by control logic circuit 320. Network packet 510 may be read and parsed by control logic circuit 320. A task distribution technique may be selected for distributing network packet 510 based on, for example, the category of network packet 510 determined using certain fields of network packet 510 as described above. In the example shown in FIG. 5, a network packet 510 may be from a flow (e.g., a TCP flow) that includes network packets transmitted according to a certain order, and an RSS scheduler may be used to forward network packet 510 to a CPU. Based on the status (e.g., load status) of CPUs in the system as described above and certain fields in network packet 510, a CPU group selector 520 (which may be an example of resource group selection unit 342) may select a CPU list from a CPU list table 522 (which may be an example of processing unit table 344), where CPU list table 522 may store, for example, a respective CPU list for each flow or category of network packets. The selected CPU list may include CPUs with relatively low load and may be more suitable for processing network packet 510.

In the illustrated example, an RSS scheduler 530 may select a CPU from the CPU list selected by CPU group selector 520, based on information associated with network packet 510. As describe above, RSS scheduler 530 may use certain selected fields of network packet 510 (e.g., the L3/4 5-tuple described above) as input to perform a hash function to generate a hash value, take a modulo of the hash value (e.g., using a hash mask to mask MSBs of the hash value), and index an indirection table 540 using the modulo to identify a CPU from the selected CPU list. In implementations where the hash function uses the L3/4 5-tuple of network packet 510 as input, a same CPU may be selected from the CPU list for network packets in the same flow. In some implementations, a packet counter value (e.g., the packet number) may be used as an input to the hash function, and thus network packets in the same flow may be relatively evenly distributed to CPUs in the selected CPU list.

Figure 6:
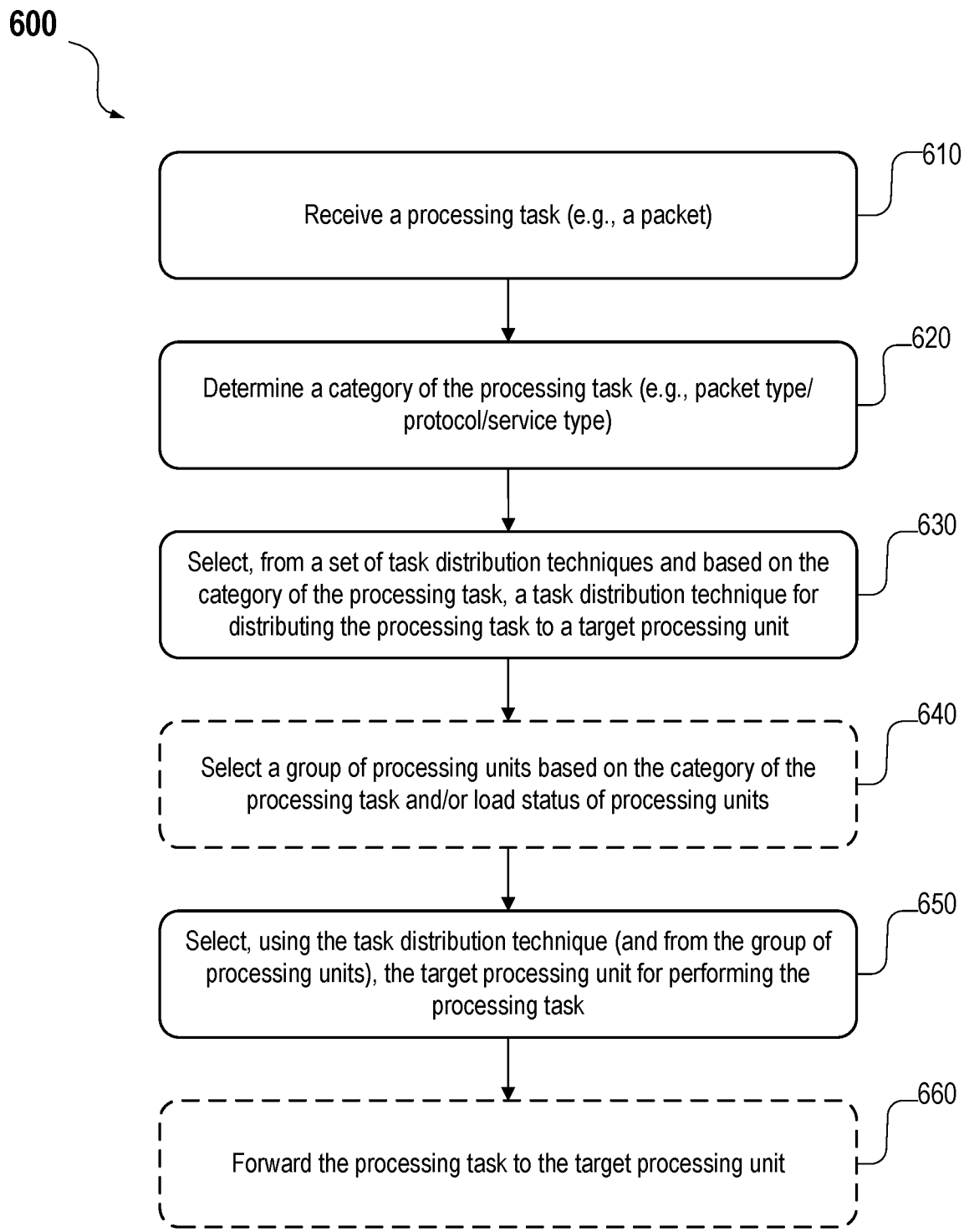
FIG. 6 includes a flowchart illustrating an example of a process for distributing processing tasks to processing units according to certain embodiments.

FIG. 6 includes a flowchart 600 illustrating an example of a process for distributing processing tasks to processing units according to certain embodiments. Operations described in flowchart 600 may be performed by, for example, control logic circuit 320 or device 300 described above with respect to FIG. 3. Although flowchart 600 may describe the operations as a sequential process, in various embodiments, some of the operations may be performed in parallel or concurrently. In addition, the order of the operations may be rearranged. For example, operations at block 630 and operations at block 640 may be performed in a different order or may be performed concurrently. A process may have additional steps not shown in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium or may be carried by a data carrying signal.

At block 610, a control logic circuit (e.g., control logic circuit 320) of a device (e.g., device 300 or a network device 700 described below, such as a network interface card) may receive a processing task, such as a network packet to be processed. The network packet may be, for example, an IPv4 packet or an IPv6 packet, a TCP packet, a UDP packet, an RDMA packet, or a storage transport layer packet. The processing task may be performed by, for example, CPUs, network processors, DMAs, neural network accelerators, other processing engines, or queues.

At block 620, the control logic circuit (e.g., a pre-selector in the control logic circuit, such as pre-selector 340 of control logic circuit 320) may determine a category of the processing task. The category of the processing task may include a packet type of the network packet, a protocol of the network packet, a type of service of the network packet, or a combination thereof. As described above, the control logic circuit may parse the network packet and use information in certain fields of the network packet to determine the category of the network packet.

At block 630, the control logic circuit may select, from a set of task distribution techniques and based at least in part on the category of the processing task, a task distribution technique for distributing the processing task to a group of processing units. The set of task distribution techniques may include, for example, random distribution technique, round robin (RR) distribution technique, weighted round robin (WRR) distribution technique, or receive side scaling (RSS) distribution technique. In some embodiments, the control logic circuit may determine load status of the group of processing units, and may select the task distribution technique from the set of task distribution techniques based on both the category of the processing task and the load status of the group of processing units.

Optionally, at block 640, the control logic circuit may select the group of processing units from a plurality of processing units, based on the category of the processing task, load status of the plurality of processing units, or both. In some embodiments, the control logic circuit may include a processing unit table that stores a plurality of lists of processing units, where each list of processing units in the plurality of lists of processing units may correspond to a category of a plurality of categories of processing tasks and/or a task distribution technique. The control logic circuit may be configured to select the group of processing units by selecting a list of processing units in the plurality of lists of processing units. In some embodiments, the control logic circuit may be configured to modify the plurality of lists of processing units based on the load status of the plurality of processing units.

At block 650, the control logic circuit may select, using the selected task distribution technique and from the selected group of processing units, a target processing unit for performing the processing task, for example, based on weights of the group of processing units, the load status of the group of processing units, batch sizes of the group of processing units, or a combination thereof.

Optionally, at block 660, the control logic circuit may forward the processing task to the target processing unit or a queue for the target processing unit. The target processing unit may poll the processing task from the queue for processing after the target processing unit has performed other processing tasks before the processing task in the queue.

Figure 7:
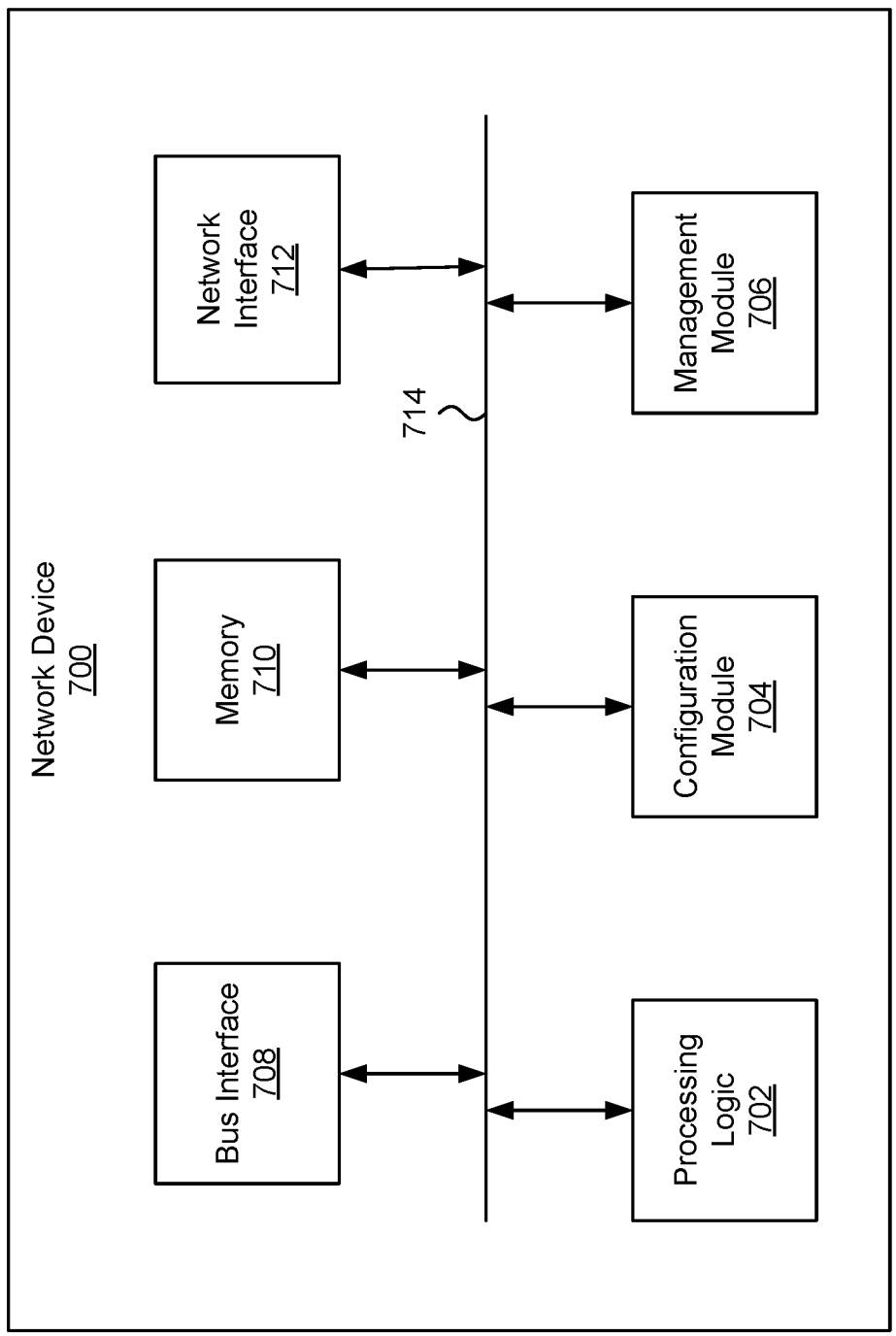
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing units from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
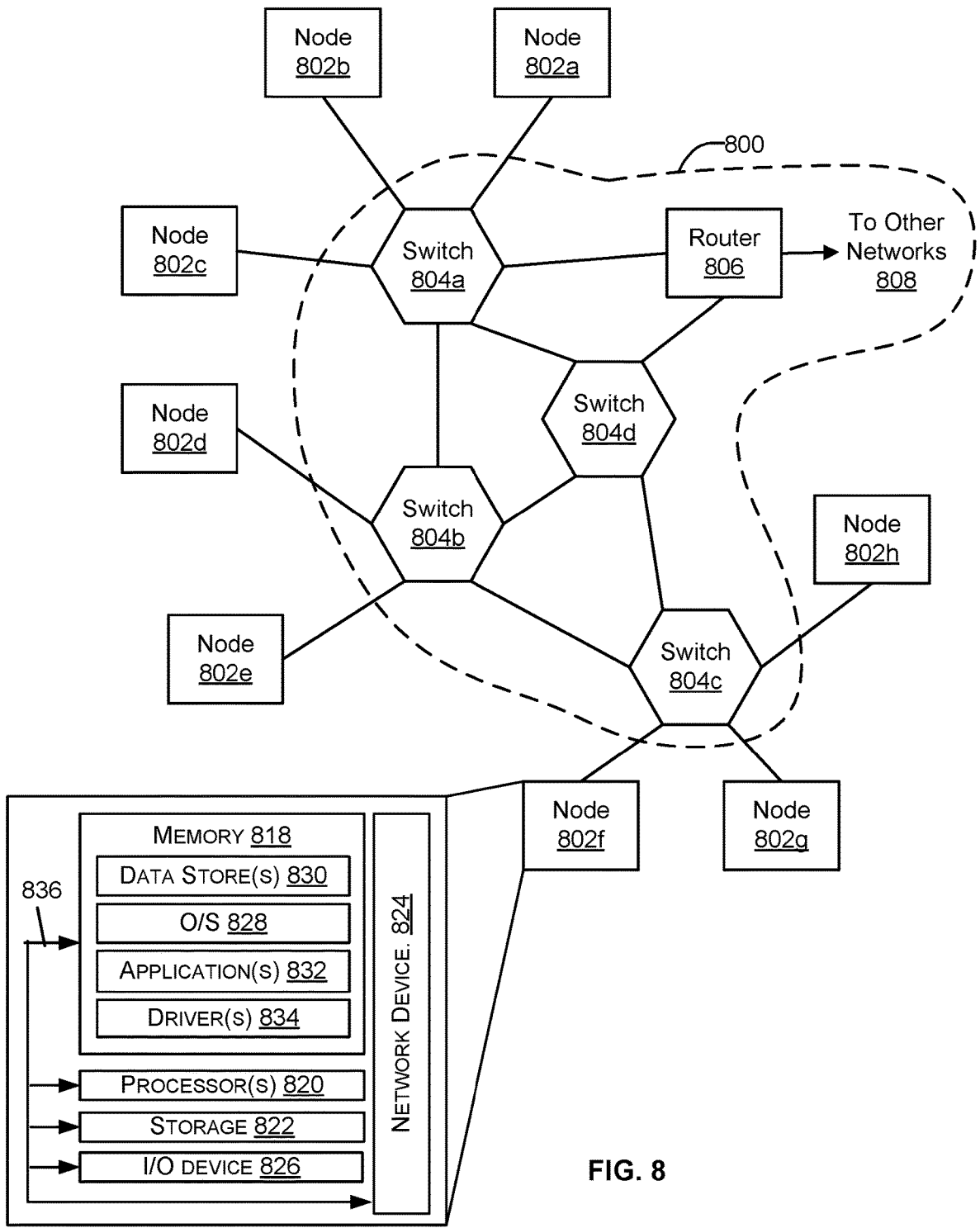
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804*a*-804*d*, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804*a*-804*d* may be connected to a plurality of nodes 802*a*-802*h* and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804*a*-804*d* and router 806, if present, may be referred to as a switch fabric, a fabric, a network fabric, or simply a network. In the context of a computer network, terms "fabric" and "network" may be used interchangeably herein.

Nodes 802*a*-802*h* may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s)) 820. The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
a plurality of processing units; and
a device including a control circuit configured to receive a plurality of processing tasks in different packet streams, wherein each processing task of the plurality of processing tasks is received as a network packet in a respective packet stream, and wherein the control circuit is further configured to, for each processing task of the plurality of processing tasks:
determine a category of the processing task based on a header of the corresponding network packet, wherein the header comprises one or more fields from which the device determines the category of the processing task as corresponding to a packet type of the network packet, a network protocol of the network packet, a type of service of the network packet, or a combination thereof;
select, from a set of task distribution techniques and based on the category of the processing task, a task distribution technique for distributing the processing task to the plurality of processing units, wherein the control circuit is configured to select the task distribution technique through:
selecting, in some instances, a round robin (RR) or weighted round robin (WRR) distribution technique based on the category indicating that the processing task can be performed out-of-order relative to other processing tasks in the respective packet stream; and
selecting, in other instances, a receive side scaling (RSS) distribution technique based on the category indicating that the processing task must be performed in order with other processing tasks in the respective packet stream;
select, using the selected task distribution technique and from the plurality of processing units, a target processing unit for performing the processing task; and
forward the processing task to the selected target processing unit.

2. The system of claim 1, wherein the control circuit is configured to:
select a group of processing units from the plurality of processing units, based on the category of the processing task, load status of the plurality of processing units, or both; and
select, using the selected task distribution technique and from the selected group of processing units, the target processing unit for performing the processing task.

3. The system of claim 1, wherein the control circuit is configured to:
determine load status of the plurality of processing units, wherein selecting, from the plurality of processing units, the target processing unit includes selecting the target processing unit based on weights of the plurality of processing units, the load status of the plurality of processing units, batch sizes of the plurality of processing units, or a combination thereof.

4. An integrated circuit for distributing processing tasks, the integrated circuit comprising:
a pre-selector circuit configured to:
receive a plurality of processing tasks in different packet streams, wherein each processing task of the plurality of processing tasks is received as a network packet in a respective packet stream; and
for each processing task of the plurality of processing tasks:
determine a category of the processing task based on a header of the corresponding network packet, wherein the header comprises one or more fields from which the pre-selector circuit determines the category of the processing task as corresponding to a packet type of the network packet, a network protocol of the network packet, a type of service of the network packet, or a combination thereof; and
select, from a set of task distribution techniques and based on the category of the processing task, a task distribution technique for distributing the processing task to a group of processing units, wherein the pre-selector circuit is configured to select the task distribution technique through:
selecting, in some instances, a round robin (RR) or weighted round robin (WRR) distribution technique based on the category indicating that the processing task can be performed out-of-order relative to other processing tasks in the respective packet stream; and
selecting, in other instances, a receive side scaling (RSS) distribution technique based on the category indicating that the processing task must be performed in order with other processing tasks in the respective packet stream; and
a scheduler configured to, for each processing task of the plurality of processing tasks, apply the selected task distribution technique to select, from the group of processing units, a target processing unit for performing the processing task.

5. The integrated circuit of claim 4, wherein the pre-selector circuit is configured to select the group of processing units from a plurality of processing units, based on the category of the processing task, load status of the plurality of processing units, or both.

6. The integrated circuit of claim 5, wherein:
the pre-selector circuit includes a processing unit table that stores a plurality of lists of processing units;
the pre-selector circuit is configured to select the group of processing units by selecting a list of processing units in the plurality of lists of processing units; and
the pre-selector circuit is configured to modify the plurality of lists of processing units based on the load status of the plurality of processing units.

7. The integrated circuit of claim 4, wherein the set of task distribution techniques includes the RR or WRR distribution technique, the RSS distribution technique, and a random distribution technique.

8. The integrated circuit of claim 4, wherein the scheduler is configured to distribute a batch of processing tasks to a processing unit of the group of processing units.

9. The integrated circuit of claim 8, wherein the pre-selector circuit or the scheduler is configured to modify a batch size of the batch of processing tasks based on categories of the processing tasks, load status of the group of processing units, or both.

10. The integrated circuit of claim 4, further comprising a load state circuit configured to collect or receive load information of the group of processing units.

11. The integrated circuit of claim 4, wherein:
the plurality of processing tasks includes a first processing task received as a Transmission Control Protocol (TCP) packet; and
the scheduler is configured to implement the RSS distribution technique using a hash function that uses information in the TCP packet, a packet number of the TCP packet, or both.

12. The integrated circuit of claim 4, wherein the scheduler is configured to select, from the group of processing units, the target processing unit based on weights or load status of the group of processing units.

13. The integrated circuit of claim 4, wherein the group of processing units includes central processing units (CPUs), direct memory access (DMA) engines, network processors, queues, neural network accelerators, or a combination thereof.

14. A computer-implemented method, comprising:
receiving a plurality of processing tasks in different packet streams, wherein each processing task of the plurality of processing tasks is received as a network packet in a respective packet stream; and
for each processing task of the plurality of processing tasks:
determining a category of the processing task based on a header of the corresponding network packet, wherein the header comprises one or more fields from which the category of the processing task is determined as corresponding to a packet type of the network packet, a network protocol of the network packet, a type of service of the network packet, or a combination thereof;
selecting, from a set of task distribution techniques and based on the category of the processing task, a task distribution technique for distributing the processing task to a group of processing units, wherein selecting the task distribution technique comprises:
selecting, in some instances, a round robin (RR) or weighted round robin (WRR) distribution technique based on the category indicating that the processing task can be performed out-of-order relative to other processing tasks in the respective packet stream; and
selecting, in other instances, a receive side scaling (RSS) distribution technique based on the category indicating that the processing task must be performed in order with other processing tasks in the respective packet stream; and
selecting, using the selected task distribution technique and from the group of processing units, a target processing unit for performing the processing task.

15. The computer-implemented method of claim 14, further comprising selecting the group of processing units from a plurality of processing units, based on the category of the processing task, load status of the plurality of processing units, or both.

16. The computer-implemented method of claim 14, wherein the set of task distribution techniques includes the RR or WRR distribution technique, the RSS distribution technique, and a random distribution technique.

17. The computer-implemented method of claim 14, further comprising:
determining load status of the group of processing units,
wherein selecting, from the set of task distribution techniques and based on the category of the processing task, the task distribution technique includes selecting the task distribution technique based on both the category of the processing task and the load status of the group of processing units, and
wherein selecting, from the group of processing units, the target processing unit includes selecting the target processing unit based on weights of the group of processing units, the load status of the group of processing units, batch sizes of the group of processing units, or a combination thereof.

* * * * *